United States Patent
Harjula

(10) Patent No.: US 7,581,223 B2
(45) Date of Patent: Aug. 25, 2009

(54) METHOD AND A SYSTEM FOR EXECUTING OPERATING SYSTEM FUNCTIONS, AS WELL AS AN ELECTRONIC DEVICE

(75) Inventor: Teemu Harjula, Valkkinen (FI)

(73) Assignee: Nokia Corporation, Espoo (FI)

( * ) Notice: Subject to any disclaimer, the term of this patent is extended or adjusted under 35 U.S.C. 154(b) by 1147 days.

(21) Appl. No.: 10/327,243

(22) Filed: Dec. 20, 2002

(65) Prior Publication Data

US 2003/0120706 A1    Jun. 26, 2003

(30) Foreign Application Priority Data

Dec. 20, 2001    (FI) ................................. 20012527

(51) Int. Cl.
*G06F 9/44* (2006.01)
*G06F 9/46* (2006.01)

(52) U.S. Cl. ........................ 718/104; 718/102; 719/319

(58) Field of Classification Search .............. 718/104, 718/107, 1, 102; 719/319, 320
See application file for complete search history.

(56) References Cited

U.S. PATENT DOCUMENTS

| | | | |
|---|---|---|---|
| 4,003,028 A * | 1/1977 | Bennett et al. .............. 710/269 |
| 4,747,040 A | 5/1988 | Blanset et al. |
| 4,993,017 A * | 2/1991 | Bachinger et al. ........... 370/360 |
| 5,319,782 A | 6/1994 | Goldberg et al. ............ 395/650 |
| 5,325,526 A * | 6/1994 | Cameron et al. ............ 718/102 |
| 5,471,615 A | 11/1995 | Amatsu et al. ......... 395/200.03 |
| 6,061,709 A * | 5/2000 | Bronte ........................ 718/103 |
| 6,138,010 A * | 10/2000 | Rabe et al. ................ 455/426.1 |
| 6,141,697 A | 10/2000 | Hale et al. ................... 709/312 |
| 6,269,409 B1 | 7/2001 | Solomon |
| 6,631,394 B1 * | 10/2003 | Ronkka et al. ............. 718/100 |
| 6,684,261 B1 * | 1/2004 | Orton et al. ................. 719/328 |
| 6,725,456 B1 * | 4/2004 | Bruno et al. ................ 718/102 |
| 6,772,419 B1 * | 8/2004 | Sekiguchi et al. ........... 719/319 |
| 6,785,889 B1 * | 8/2004 | Williams .................... 718/104 |
| 6,832,381 B1 * | 12/2004 | Mathur et al. ............... 719/328 |

(Continued)

FOREIGN PATENT DOCUMENTS

EP    0798637    10/1997

(Continued)

OTHER PUBLICATIONS

Yan et al. "Resource management in software-programmable router operating systems", IEEE Mar. 2001, pp. 488-450.*

(Continued)

*Primary Examiner*—Van H Nguyen

(57) ABSTRACT

A method is provided for use in a system. The system comprises at least one processor. A first operating system and a second operating system are processed in the processor. A first set of resources is controlled by resource services of the first operating system to be executed in the first operating system, and a second set of resources is controlled by resource services of the second operating system to be executed in the second operating system. To use a resource of the first set, a function call comprising information about the resource of the first set is formed in the second operating system. The function call is transferred to an interface block formed between the operating systems. In response to the function call, a service call on the basis of the information included in the function call is formed to start the resource service of the first operating system.

11 Claims, 6 Drawing Sheets

U.S. PATENT DOCUMENTS

| | | | |
|---|---|---|---|
| 7,058,949 B1 * | 6/2006 | Willen et al. | 718/104 |
| 7,062,766 B2 * | 6/2006 | Ronkka et al. | 718/100 |
| 7,127,723 B2 * | 10/2006 | Endo et al. | 719/319 |
| 2001/0016879 A1 | 8/2001 | Sekiguchi et al. | |

OTHER PUBLICATIONS

Thoen et al. "Real-time multi-tasking in software synthesis for information processing systems", IEEE 1995, pp. 48-53.*

* cited by examiner

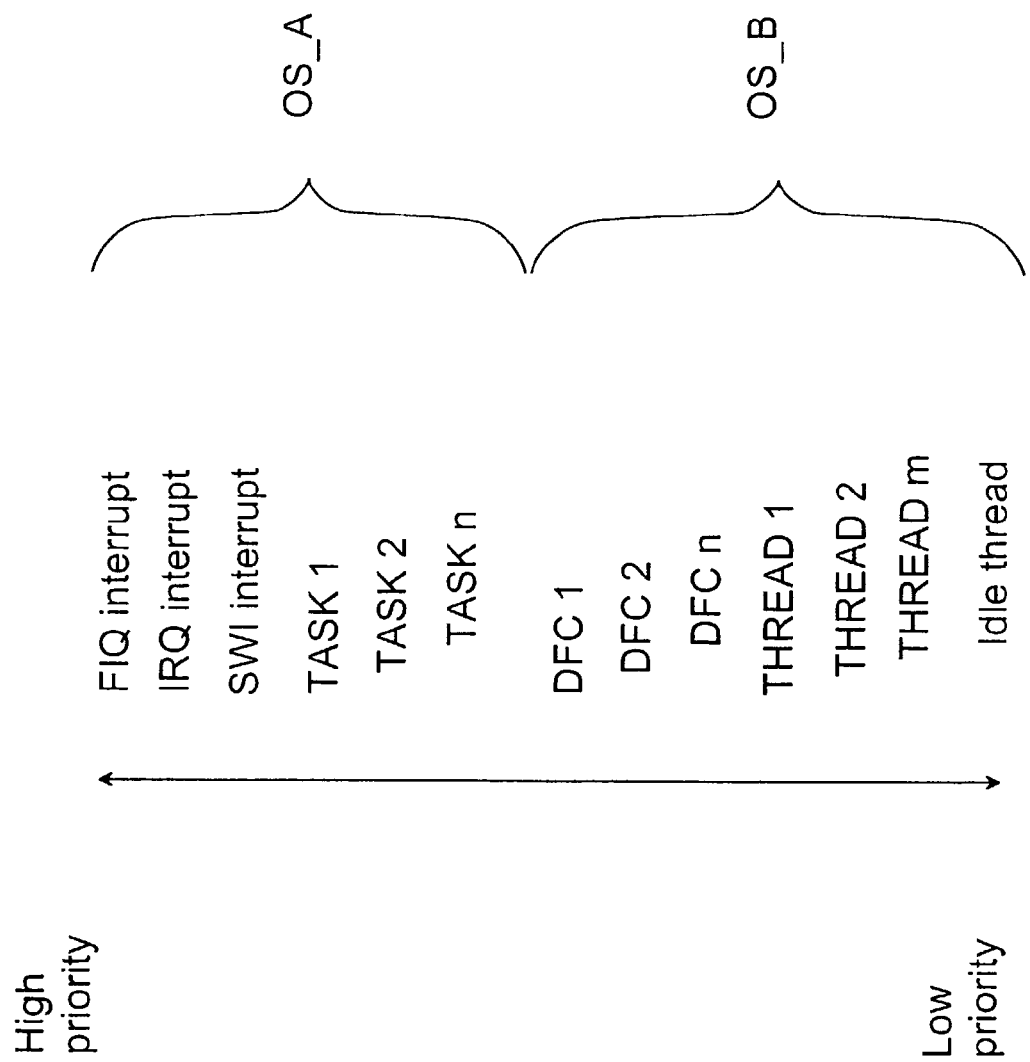

METHOD AND A SYSTEM FOR EXECUTING OPERATING SYSTEM FUNCTIONS, AS WELL AS AN ELECTRONIC DEVICE

FIELD OF THE INVENTION

The present invention relates to a method for executing operating system functions in a system comprising at least one processor and at least a first set of resources and a second set of resources, wherein at least a first operating system is executed in said at least one processor and a second operating system is executed in said at least one processor, of which operating systems at least one is substantially a real-time operating system, said first set of resources is controlled by resource services of the first operating system to be executed in the first operating system, and said second set of resources is controlled by resource services of the second operating system to be executed in the second operating system. The invention also relates to a system comprising at least one processor and at least a first set of resources and a second set of resources, means for executing at least a first operating system in said at least one processor and means for executing a second operating system in said at least one processor, of which operating systems at least one is substantially a real-time operating system, and which system comprises means for controlling said first set of resources with resource services of the first operating system to be executed in the first operating system, and means for controlling said second set of resources with resource services of the second operating system to be executed in the second operating system. The invention also relates to an electronic device comprising at least one processor and at least a first set of resources and a second set of resources, means for executing at least a first operating system in said at least one processor and means for executing a second operating system in said at least one processor, of which operating systems at least one is substantially a real-time operating system, and which electronic device comprises means for controlling said first set of resources with resource services of the first operating system to be executed in the first operating system, and means for controlling said second set of resources with resource services of the second operating system to be executed in the second operating system. Furthermore, the invention relates to computer software intended to be stored in the memory means of an electronic device for executing program commands of the computer software, which electronic device comprises at least one processor and at least a first set of resources and a second set of resources, and which computer software comprises program commands for using the resources, program commands for executing at least a first operating system in said at least one processor, program commands for executing a second operating system in said at least one processor, of which operating systems at least one is substantially a real-time operating system, program commands for controlling resources of said first set with resource services of the first operating system to be executed in the first operating system, and program commands for controlling resources of said second set with resource services of the second operating system to be executed in the second operating system.

The operating system controls the operations of a device, such as a computer, as well as the execution of applications (application programs) to be run in the device. In the operating system, applications are run in for example one or more processes. Each process may consist of one or more threads which are executed virtually at the same time. When the application is started, the operating system forms the necessary processes and at least one thread (primary thread) for each process. For a majority of processes, the formation of this primary thread will be sufficient. However, the processes may constitute several threads.

For each process of the application, a separate address space is allocated in the memory space of the device. This address space consists of one or more ranges which can be handled by this process only. The processes of the application cannot directly handle the memory allocated for other processes outside their own address space.

In operating systems similar to that presented above, there is still the kernel process of the operating system which is slightly different from the processes of the applications. The threads of the kernel process are executed at the highest access level of the processor. The kernel process preferably comprises at least two threads: a kernel server thread and an idle thread. The execution of the kernel server thread is started in connection with the start-up of the operating system, and it is used for executing all the functions of the kernel of the operating system. This thread has the highest priority. The idle thread is only executed when no other thread is ready to be executed.

The threads are executed independently, and they have no information about the execution of other threads. The scheduling of the order of execution of the threads is pre-emptive in such a way that, as a general rule, the execution of a thread can be interrupted for the execution of another thread.

BACKGROUND OF THE INVENTION

There are known devices and systems, in which it is possible to execute two different operating systems. In some devices, these operating systems can be executed simultaneously, wherein, for example, the user can select the operating system whose information is to be displayed. U.S. Pat. No. 4,747,040 presents one such computer in which it is possible to run the UNIX® and MS-DOS® operating systems. In these devices, it is important to secure that the operating system cannot interfere with such resources controlled by the other operating system, for which the operating system has no access rights. This can be arranged, for example, in such a way that the second operating system operates under the control of the first operating system, wherein the first operating system allocates resources and control rights to the second operating system. The first operating system can also prevent the access of the second operating system to resources allocated for the use of the first operating system only. An example of such a system is VMware™ developed by WMware Inc.

Also such devices are known, in which two operating systems are set to function in the same processor. In this case, the processing of the first operating system and the processing of the second operating system are alternated in the processor. Resource protection can be implemented, for example, in such a way that the first operating system operates in the protected mode, or the like, of the processor, and the second operating system operates in the normal mode of the processor. An operating system to be executed in the protected mode of the processor will have access to all resources, but in the normal mode, the access rights are limited. Thus, the operating system to be run in the normal mode cannot affect certain resources of the operating system to be used in the protected mode.

Also, portable electronic devices have been developed, in which two different operating systems are implemented. In such electronic devices, one operating system is typically a so-called real time operating system (RTOS), whereas the other operating system is typically a non-real time operating system This non-real time operating system can schedule the processing of different functions for example by means of a scheduler or the like which allocates processing time for processes to be run under the control of the operating system. Different processes can be allocated different priorities which determine how much processing time is to be allocated for each process. Normally, the operating of the real time operating system is largely based on pre-empting, wherein a process which needs processing time sets an interrupt which is detected by the real time operating system and set for running this process. Also in the real time operating system, the processes can typically be arranged in an order of priority according to importance and/or urgency. Thus, a process of less importance or a lower priority can be interrupted by a process of more importance or a higher priority; however, a process of a higher priority cannot be interrupted by a process of a lower priority, but such a process of a lower priority will be continued first after all the processes of a higher priority have been served.

FIG. 1a shows, on a principle level, the implementation of two operating systems in the same device. The first operating system OS_A is a real time operating system, and the second operating system OS_B is a non-real time operating system. The first operating system OS_A operates on the basis of interrupts. In this example, it is assumed that the interrupts are further divided into three different categories, wherein the order of importance between the interrupts is the following: The highest priority belongs to fast interrupt requests (FIQ), the next highest priority belongs to interrupt requests (IRQ), and the lowest priority belongs to software interrupt requests (SWI). For each interrupt request, an interrupt service program is provided, to which the operation of the processor is transferred when an interrupt service request enters the processor. This interrupt service program contains program commands for taking the measures required by the event that caused the interrupt request, or for starting such measures.

Furthermore, it is possible to execute tasks for providing a desired function in the first operating system. These tasks are allocated execution time when there are no tasks with a higher priority to be executed. The tasks can also be set in an order of importance, wherein the execution time allocated for different tasks can be different. In the example of FIG. 1a, the second operating system is implemented as one task of the first operating system, wherein the second operating system is executed when this task is in turn to be executed. Typically, in systems of one processor, this second operating system is allocated the lowest priority, wherein it is executed when there are no other tasks or interrupt service programs to be executed.

In the example of FIG. 1a, the second operating system comprises delayed function calls (DFC) which are preferably allocated the highest priority in this second operating system. In addition to these, threads are processed in the second operating system. The threads can be command sequences to be used in the execution of the same process or different processes. A null thread is executed when there is no other process to be executed. Thus, the null thread has the lowest priority in this example case.

In FIG. 1a, the above-described different units are marked in a priority order from top downwards in such a way that the fast interrupt requests, at the top in the figure, have the highest priority. From the point of view of the first operating system, the second operating system is the execution of an idle task. In a corresponding manner, from the point of view of the second operating system, the first operating system is the execution of an interrupt service.

A problem in prior art devices having more than one operating system is, for example, that the execution of a process of one operating system may stop the operation of the whole device. This may be due, for example, to the fact that the second operating system operating under the control of the first operating system locks such a resource which the first operating system needs for executing a time critical task. Another reason for the stopping of the operation may be that a first call by the second operating system to the first operating system locks a resource which is required by a second call to the first operating system.

SUMMARY OF THE INVENTION

It is an aim of the present invention to provide an improved method and a system in which two or more operating systems can be executed simultaneously. In the method, each operating system can be allowed to have access to at least some resources of other operating systems without the possibility of any operating system to prevent the use of the resource from the other operating systems. The invention is based on the idea that the operating system needing a resource sends a function call to the operating system whose resource is needed by the the operating system which transmitted the function call. The calling operating system does not, however, remain waiting for a response but will continue its operation. The receiving or called operating system executes the function indicated in the function call and transmits a response to the calling operating system. To put it more precisely, the method according to the present invention is primarily characterized in that for using a resource of the first set from the second operating system, a function call is made in the second operating system, comprising information about said resource of the first set, and that said function call is transmitted to an interface block between the operating systems formed in the system, in which block a service call is made to start the resource service of the first operating system. The system according to the invention is primarily characterized in that the system comprises an interface block between the operating systems, means for using a resource of said first set from the second operating system, comprising means for making a function call in the second operating system, which function call comprises information about said resource of the first set, and means for transmitting said function call to said interface block between the operating systems, comprising means for making a service call to start the resource service of the first operating system on the basis of data included in said function call. The electronic device according to the invention is primarily characterized in that the electronic device comprises an interface block between the operating systems, means for using a resource of said first set from the second operating system, comprising means for making a function call in the second operating system, which function call comprises information about said resource of the first set, and means for transmitting said function call to said interface block between the operating systems, comprising means for making a service call to start the resource service of the first operating system on the basis of data included in said function call. The computer software according to the invention is primarily characterized in that the computer software also includes program commands for using said resource of the first set from the second operating system by making a function call in the second operating system, comprising information about said resource of the first set, program commands for transmitting said function call to an interface block between the operating blocks formed in the system, and program commands for making a service call to start the resource service of the first operating system on the basis of information included in said function call.

The present invention shows remarkable advantages over solutions of prior art. By the method of the invention, it is possible, in a system of several operating systems, to offer resources controlled by one operating system to other operating systems. In the method according to the invention, it is possible to avoid the locking of said resource by a resource request, preventing other operating systems from using it. The method also allows a simpler development of applications and operating systems, because the interface between the operating systems is relatively simple and compact.

BRIEF DESCRIPTION OF THE DRAWINGS

In the following, the invention will be described in more detail with reference to the appended drawings, in which FIG. 1a illustrates, on the principle level, a solution for implementing two operating systems in the same device.

DETAILED DESCRIPTION OF THE INVENTION

Figure 2:
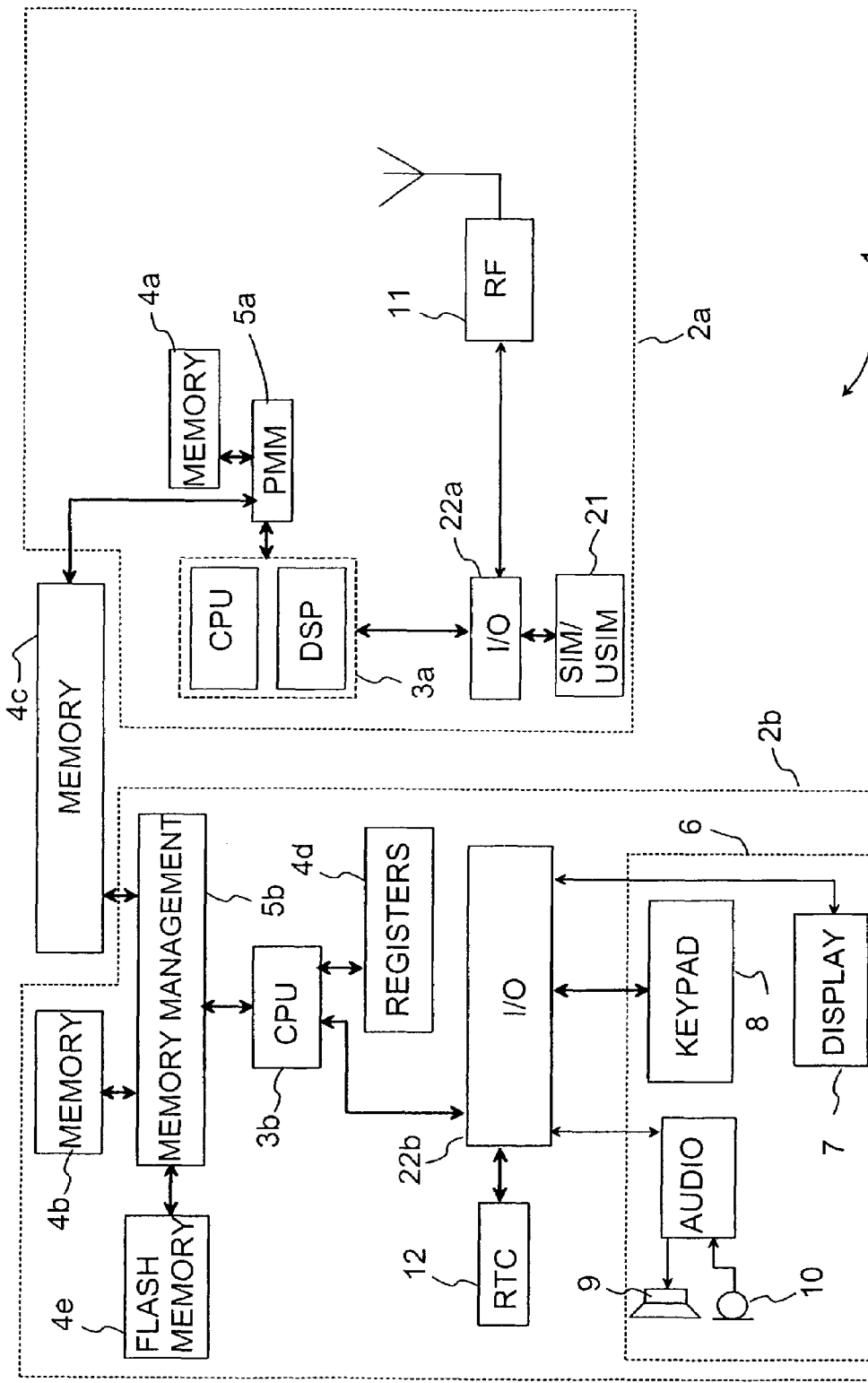
FIG. 2 shows an electronic device according to a preferred embodiment of the invention in a reduced block chart.

In the following detailed description of the invention, the electronic device 1 of FIG. 2 will be used as an example, preferably comprising communication functions 2a, such as mobile station functions, as well as data processing functions 2b. In this preferred embodiment, the electronic device 1 comprises two processors 3a, 3b, but it is obvious that the invention can also be applied in electronic devices 1 where the number of processors 3a, 3b is other than two. Furthermore, FIG. 2 only shows a few functions of the electronic device 1, but it is obvious that, in practical applications, the detailed implementation of the electronic device 1 can differ from that presented herein.

The first processor 3a of the electronic device 1 is primarily intended for the control of communication functions 2a, and the second processor 3b is, in a corresponding manner, primarily intended for the execution of data processing functions 2b. The processor 3a, 3b preferably comprises a microprocessor (central processing unit, CPU) or the like to execute operating system functions. Furthermore, the electronic device 1 may also comprise other processors, such as a digital signal processor (DSP), which can be used, for example, in signal processing functions in a way known as such. Furthermore, the electronic device 1 comprises a memory 4a, 4b, 4c, 4d, of which at least a part is arranged as a memory 4c available to both processors 3a, 3b. In the electronic device 1 of FIG. 2, each processor 3a, 3b also has a memory 4a, 4b allocated solely for its own use. The memory can also comprise processor registers 4d, a Flash memory 4e, etc. For memory management, the first processor 3a is provided with a first memory management unit 5a. In a corresponding manner, the second processor 3b is provided with a second memory management unit 5b. The electronic device 1 comprises at least one user interface 6 which preferably comprises at least a display 7, data input means, such as a keypad 8, and audio means, such as an earpiece/speaker 9 and a microphone 10. For the communication functions, the electronic device 1 is provided with a transceiver 11, for example, for communication with a mobile communication network. A real time clock (RTC) 12 is intended for maintaining time data in the electronic device 1. In addition to time data, the real time clock 12 may also comprise calendar functions in a way known as such.

If necessary, the communication functions 2a can also comprise a subscriber identification unit 21 (subscriber identity module, SIM; UMTS subscriber identity module, USIM) or corresponding means for identifying the user. Furthermore, the electronic device 1 normally comprises a connection logic 22a, 22b, for example, for communication by the subscriber identification unit 21, the user interface 6 and the transceiver 11 with the processor 3a, 3b.

A first operating system OS_A arranged in connection with the first processor 3a is primarily intended for controlling the communication functions. In a corresponding manner, a second operating system OS_B arranged in connection with the second processor 3b is primarily intended for using data processing functions. However, some of the resources of the electronic device 1 may be needed by both operating systems but cannot be used by them simultaneously. For example, if the user interface 6 of the electronic device 1, or a part of it, is common to both the communication functions and the data processing functions, the resources of the user interface 6, or at least a part of them, should be available to both operating systems OS_A, OS_B. Another example to be mentioned is the use of the functions of the real time clock 12. The first operating system OS_A is a real time operating system whose operation is, in this preferred embodiment, largely based on interruptions. The purpose of the first operating system OS_A is to take care of the execution of e.g. time-critical tasks, such as communication protocols. The second operating system OS_B is, in this example, a non-real time operating system, but it is obvious that also the second operating system OS_B can be a real-time operating system. The purpose of the second operating system OS_B is preferably to take care of the execution of tasks displayed to the user, such as the control of the resources of the user interface 6. Furthermore, each operating system OS_A, OS_B controls over a part of the equipment of the electronic device 1.

Figure 3:
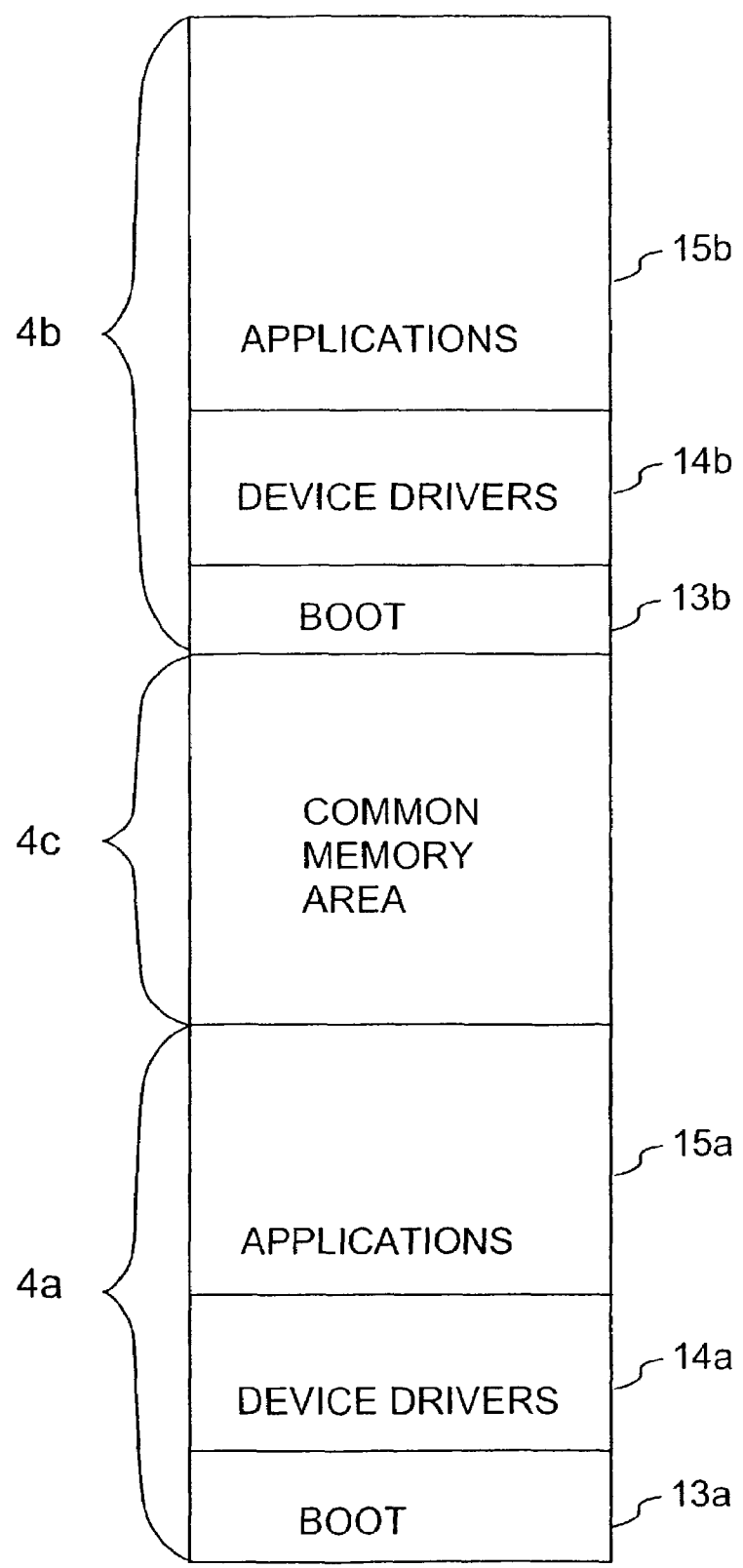
FIG. 3 shows the allocation of memory resources for different functions in an electronic device according to an advantageous embodiment of the invention.

FIG. 3 shows the allocation of memory resources for different functions in an electronic device 1 according to an advantageous embodiment of the invention. The memory is divided into a first memory area 4a, a second memory area 4b, and a common memory area 4c. The first memory area 4a is available to the first operating system OS_A being executed in the first processor 3a. The second memory area 4b is available to the second operating system OS_B being executed in the second processor 3b. The common memory area 4c can be processed by both operating systems OS_A, OS_B. In this embodiment, the division of the memory into the above-mentioned parts is implemented by means of separate memories, but it can also be implemented in another way. For the processors 3a, 3b, the corresponding memory areas 4a, 4b are provided with a boot sector 13a, 13b containing a stored program code to be run in connection with booting of the processors 3a, 3b, to boot the processors 3a, 3b and the other functional blocks of the electronic device 1. The storage of these start-up program codes can also be arranged so that they are stored in the common memory area 4c, or only the start-up program code of the second operating system is stored in the common memory area 4c. Storage space 14a, 14b is allocated in the memory areas for the storage of the program codes (e.g. device drivers) required for using the different resources. These program codes may have been stored in the memory e.g. in connection with the manufacture of the electronic device 1, or they can be loaded in the random access memory in connection with the booting e.g. from a hard disk (not shown), a FLASH memory, or the like. Furthermore, memory areas 15a, 15b are reserved in the memory 4 for the loading and storage of the program codes of applications to be run during the use of the electronic device 1.

To arrange the communication between the operating systems in the electronic device 1 according to a preferred embodiment of the invention, a memory area 4c is formed, which can be processed from both of the operating systems OS_A, OS_B, as will be presented below in this description.

It is obvious that the above-presented division into memory areas is only an advantageous example, while also another kind of division can be used in connection with the invention. Also in such an electronic device 1 in which the same processor is used for executing both operating systems OS_A, OS_B, the memory can be divided into areas, of which some are only used by one operating system and some may be used by both operating systems.

Figure 4:
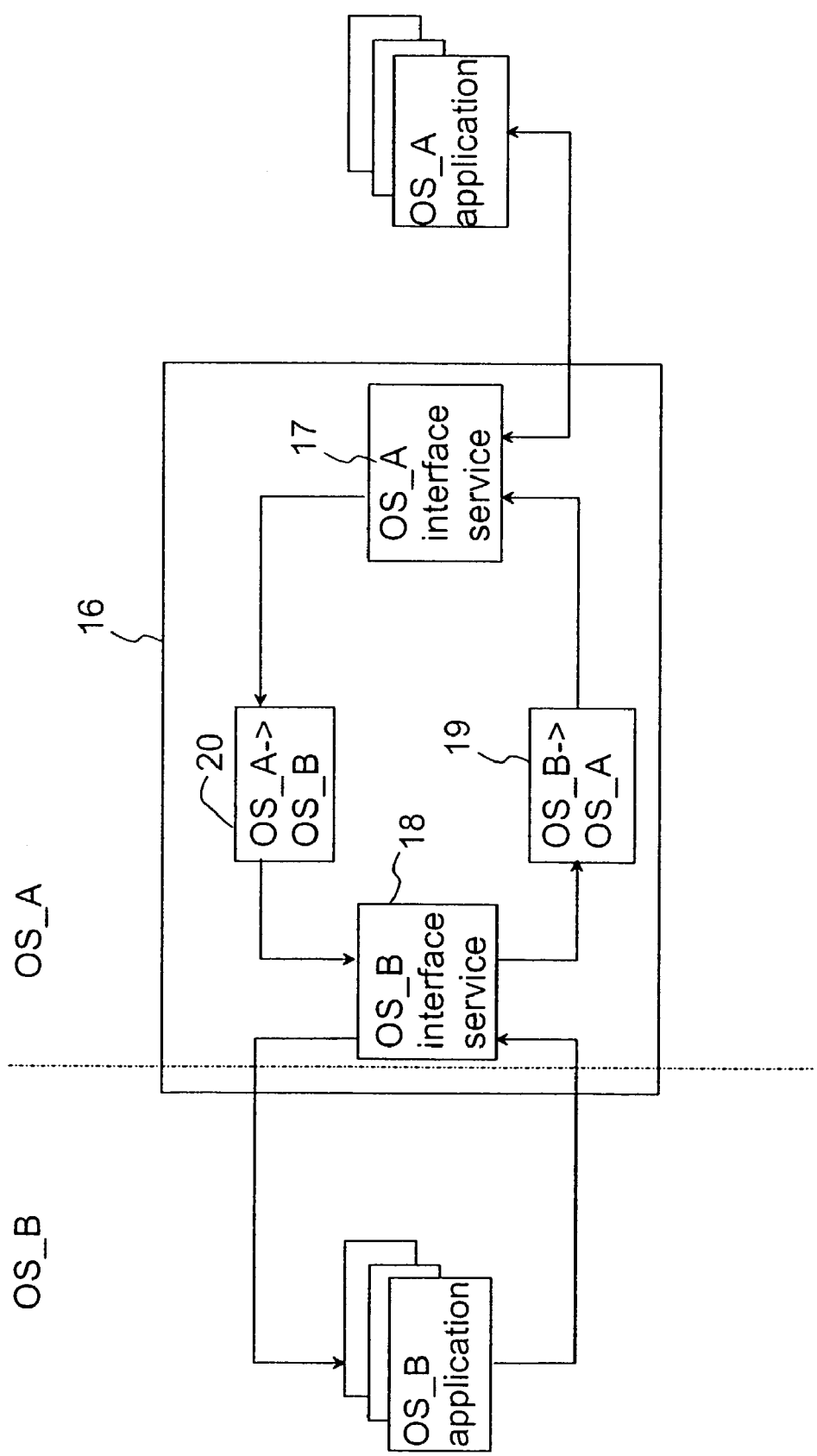
FIG. 4 shows the implementation of the interface according to a preferred embodiment of the invention in a reduced manner.

In the following, the operation of the method according to a preferred embodiment of the invention in the electronic device of FIG. 2 will be described in more detail with reference to FIG. 4. FIG. 4 shows a solution of two operating systems on the principle level, for implementing two operating systems OS_A, OS_B in the same electronic device 1. The first operating system OS_A of the electronic device 1 is provided with an interface block 16 which is used in the communication between the operating systems OS_A, OS_B by means of asynchronic function calls. This interface block 16 comprises, for example, a first interface 17, a second interface 18, a first conversion block 19, and a second conversion block 20. The function of the first interface 17 is to execute the function calls coming through the first conversion block 19 to the resources of the first operating system OS_A and to transmit the responses to the second conversion block 20 after the execution of the functions. In a corresponding manner, the function of the second interface 18 is to effect the communication procedures between the second operating system OS_B and the interface block 16. This is preferably arranged so that the first interface 17 and the second interface 18 provide various services for both the first operating system OS_A and the second operating system OS_B. For example, when the second operating system OS_B needs to use a resource located in the first operating system OS_A, the second operating system OS_B will call the second interface 18. After this, the call is transferred to the first interface 17 by using the first conversion block 19. The first interface 17 will then provide the requested service by using the resources of the first operating system OS_A and transmit a response to the second operating system OS_B by using the second conversion block 20 and the second interface service 18.

In an advantageous embodiment of the invention, the operating systems OS_A, OS_B used are so-called multiprocessing operating systems. In a multiprocessing operating system, several application programs can be run simultaneously. In practice, however, the multiprocessing operating system will execute one process at a time, except if the processor 3a, 3b is a processor with multiprocessing properties or if the number of processors used for processing the same operating system is more than one. The scheduler of the operating system will examine at regular intervals, which application programs or processes are being executed at the time. The scheduler is started e.g. by a timer interruption. Furthermore, each application program may also comprise one or more threads, wherein each thread is being processed at a different time. One thread can be, for example, the reading of data in a functional block, such as the reading of keystrokes, another thread is, for example, the processing of read data, and a third thread is, for example, the writing of processed data in a functional block, such as on the display. When this application program is started, the scheduler has determined the execution time for each thread and the repeat interval for executing the threads. Thus, the scheduler starts the execution of the thread and, after the end of the execution time, puts off the thread to wait, and stores the data of the thread in a memory, if necessary, and starts to execute the next thread which may belong to the same process or another process. After the scheduler has gone through all the threads, the scheduler restarts the execution round or, if the execution interval of no thread has expired, a so-called idle thread is executed. However, during the execution time of the above-mentioned threads, there may be incoming interrupt requests, wherein on the basis of the priority of these interrupt requests, the operating system may move on to execute an interrupt service program, or the scheduler determines a moment of time suitable for executing the interrupt service and continues the execution of the unfinished thread. For example, in an interrupt situation caused by a keystroke, the keypad interrupt program reads the code of the pressed key and stores it in a temporary memory location. After the end of the interrupt service program, the scheduler of the operating system determines a moment of time for executing the program of examining the keystroke, and returns to the interrupted program thread, if the priority allocated for the keystroke interruption did not exceed the priority of the unfinished program thread.

From the point of view of the operating system, the process is always in one of three states: ready, run or wait. The run state encompasses the processes being run at the time. The ready state encompasses the processes which are waiting to be run. It is the function of the scheduler to select one of the processes in the ready state to be executed in the run state. The wait state includes such processes which are waiting for an event, for example the reception of a response to a function call, a keystroke, the release of a resource, etc.

The scheduler moves the process with the highest priority from the ready state to the run state. From the run state, the process will typically pass to the wait state on its own request, for example when requesting for an operating system service whose implementation involves waiting. The transfer from the wait state to the ready state takes place at the end of this waiting. The process may also be shifted from the run state back to the ready state in such a situation in which the scheduler changes another process to be run, e.g. at the end of interrupt handling.

Figure 1B:
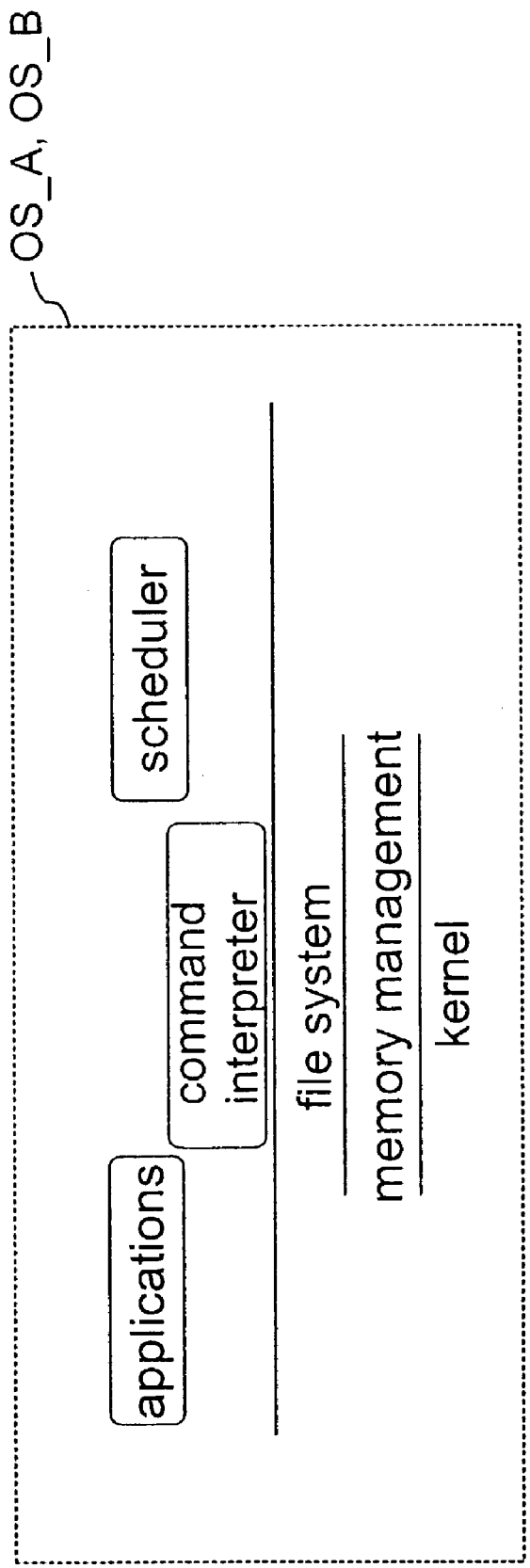
FIG. 1b shows an example of the layer structure of an operating system.
Figure 1C:
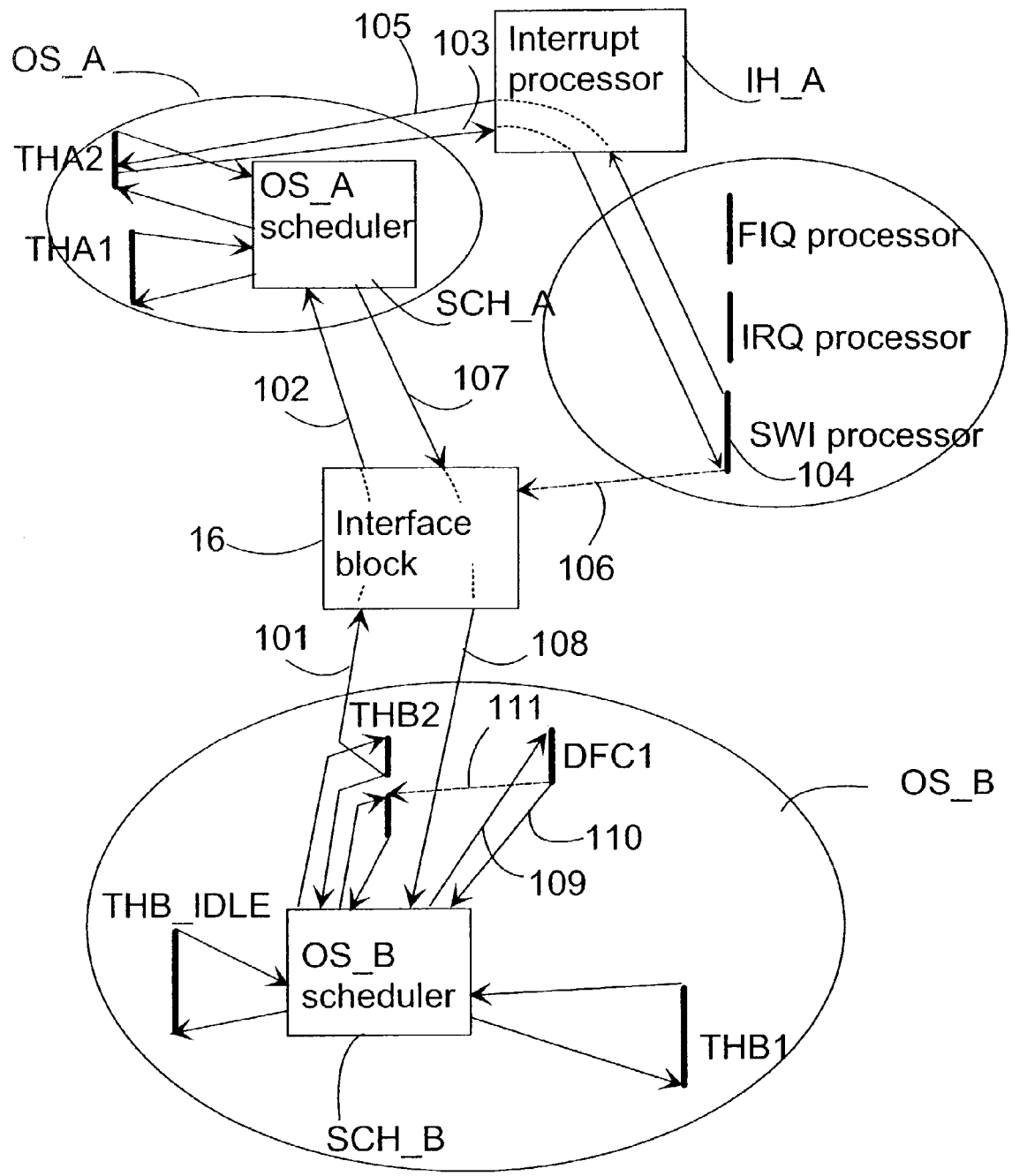
FIG. 1c shows, in a principle view, the execution of tasks of two operating systems under the control of a scheduler and an interrupt processor.

The appended FIG. 1b shows an example of the layer structure of an operating system. The lowermost level is the kernel of the operating system, the next level includes the elements related to memory management, and the third level includes the file system elements. Above these three levels are placed e.g. a command interpreter, the processes (not shown), the interface software, the scheduler functions, etc. Furthermore, FIG. 1c shows, in a principle view, the processing of threads THA1, THA2, THB1, THB2, THB_IDLE of two operating systems under the control of a scheduler SCH_A, SCH_B and an interrupt processor IH_A. On the side of the first operating system, the first thread THA1 and the second thread THA2 are, for example, the primary threads required for processing two different application programs. In a corresponding manner, on the side of the second operating system, the first thread THB1 and the second thread THB2 are, for example, the primary threads required for executing two different application programs. However, it is obvious that the threads can be threads of different processes in the same application, or even threads of the same process. Furthermore, on the side of the second operating system OS_B, an idle thread THB_IDLE is shown. The arrows illustrate transfers between different tasks which can be based on either interruption or timing.

The most essential elements of the operation of the kernel consist of the interrupt handling, the management of processes, and the control of peripheral devices. The functions dealing with the handling interrupts include, for example, the storage of data of an interrupted program and the directing of the execution to the correct interrupt service program.

The process management is responsible for e.g. creating the processes, scheduling the execution time, terminating the operation of the process, timing, etc. The control functions of the peripheral devices comprise e.g. the start-up of communication and the processing of one or more interruptions related to each peripheral device.

Normally, the implementation of the kernel involves a large number of dynamic data structures, typically bidirectional chained lists, whose elements are allocated from the free memory space in the area of the operating system. For example, the data of each process are preferably maintained in a process control block (PCB). The process control blocks are collected in a process table, whose size sets an upper limit for the number of processes in the system. In an advantageous example, e.g. the following data can be found in the process control blocks:

state of the process: wait, ready, or run,
title of the process,
priority of the process,
a space (stack) for the storage of data about interrupted processes (environments),
data about allocated resources: memory, devices, open data files, etc.,
fields related to the monitoring of the scheduling of the process, and
fields related to access rights.

It should be noted that this is only an example of the implementation of the process control block, but in practical applications, they may vary to a great extent and the data in the process control blocks can be very different.

The process identification is the title of the process, for example a serial number. On the basis of this process title, the operating system distinguishes the different processes from each other. If the process comprises more than one thread, the process identification or another field in the process control block may also include data of this thread number. A state field, or the like, is used for indicating the state of the process. Thus, the operating system changes the value of this state field when the state of the process is changed. For determining the order of running of the processes, the scheduler uses the value of the priority field, wherein, for example, the higher the numerical value contained in this field, the higher the priority of the process. Thus, by comparing the values of the priority fields of the processes in the wait state, the scheduler selects the process with the highest priority value as the process to be executed next.

We shall now describe the creating of a new process. Let us assume that the process is stored in a data file in the memory means of the device, for example in a writeable mass storage. This program is identified on the basis of the name of the data file. The kernel of the operating system contains a service routine for starting the process, for which the name of this data file is preferably given as a parameter. The start-up service routine forms a process control block for this process in the process table, and allocates a memory area for the process. The content of this data file is read into this allocated memory area, and the fields of the process control block are initialized with suitable values, after which the process can be set to wait for execution. As the process identification, it is possible to use e.g. the next vacant process identification. As the state of the process, the value ready is preferably set. The scheduler of the operating system controls these processes to be executed according to its scheduling practice.

In operating systems, in which the processes are executed in threads, the above-presented creating of the process can be applied accordingly in such a way that the start-up service routine forms one or more threads of the process and forms process control blocks for the threads in the process table.

The operating systems involve yet another essential fact for controlling peripheral devices, so-called device drivers. The device driver comprises routines and data structures required for controlling the peripheral device, such as a display 7, a keypad 8, a codec, etc. The necessary routines include e.g. the measures for initializing the device, read/write, a control routine, such as the setting of the display features, and a routine for processing interruptions related to the device. The variables and data structures related to the device can be collected, for example, in a device descriptor related to each device. This data may include for example the following:

A work sequence for concatenating the parameter blocks of transfer requests queueing to the device. If simultaneous reading and writing is possible, there can be two work sequences. The parameter blocks contain parameters of the transfer request, e.g. data about the location of a buffer, the number of the block to be transferred, etc.,
addresses of the device driver routines,
variables required for controlling the transfer, and device state data, and
device-specific parameters.

In some systems, the device drivers are processes of the operating system. The processes operate in an infinite loop, in which they first wait for a transfer request message. After receiving such a message, the device driver process starts the transfer and remains waiting for an interrupt message. The interrupt processor of the operating system will thus take care of the transfer of the interrupt message to the device driver process. In practical devices, the device driver process typically has a high priority, and the kernel of the operating system operates in real time.

In a number of operating systems, there are message transmission mechanisms available, whereby processes can transmit messages to each other. When using message queues, the process involves one or more message queues, in which the messages to be transmitted to the process can be written. The communication between processes normally involves bufferings, wherein the sender of a message does not need to wait for the receiver to receive the message. Thus, at the stage of writing a message, data (state variable) is set that there is a message to the process waiting, wherein the process will read the message at a suitable stage.

The threads THA1, THA2 of the first operating system OS_A are allocated a priority, for example, at the stage of designing of the electronic device 1. The priority can be used to influence e.g. the order of execution and response times of critical threads. The scheduler SCH_A of the first operating system schedules, in the executing routine, the thread with the highest priority at the moment to be executed first. In a system in practice, this means that the first processor 3a of the electronic device 1 according to a preferred embodiment of the invention executes the scheduler function of the first operating system OS_A, implemented with program commands in the processor 3*a*. In the execution of the threads THA1, THA2, the processor 3*a* of the system executes operations according to program commands programmed in the thread.

The second processor 3*b* executes the scheduler functions SCH_B of the second operating system OS_B on the basis of the priorities and scheduling practice of threads being executed in the second operating system OS_B. The first step is to execute delayed function calls DFC, if any were waiting, followed by the execution of the threads THB1, THB2, preferably in the order of priority. After the execution of the threads to be run, wherein there is no thread in the run state, the second processor 3*b* will shift to the idle thread THB_IDLE of the second operating system OS_B, until there is a need to perform another execution cycle.

In a situation in which a process operating under the second operating system OS_B needs to use a resource controlled by the first operating system OS_A, the following steps are taken according to a preferred embodiment of the invention. In this context, reference is made to FIG. 1*c* as well as to FIG. 4. The process THB2 needing the resource generates a function call, setting parameters related to the resource, if necessary. This function call is illustrated by arrow 101 in FIG. 1*c*. The function call is preferably always of the substantially same type (the same function), but the parameters are used to indicate the required resource in more detail and other information necessary for using the resource. Furthermore, the calling process preferably generates a delayed function call DFC or a corresponding structure, whose data are transmitted in the function call to the interface block 16.

For example, the real time clock application of the second operating system OS_B retrieves synchronization information of the real time clock from the communication means controlled by the first operating system OS_A. The synchronization data is formed, for example, on the basis of time information received via a mobile communication network. The parameters of the function call are set as the address of that memory area, in which the data to be returned are to be written on the side of the first operating system OS_A. If, in connection with the function call, there is a need to transmit information to the called resource, this information can be stored in a so-called message buffer whose address is transmitted in the parameters of the function call. Also, for the response, the calling process can allocate a message buffer whose address is thus transmitted in connection with the function call. The function call and the parameters are transmitted to the interface block 16. In the interface block 16, the function call and the parameters are transmitted via the second interface 18 (FIG. 4) to the first conversion block 19, which makes the necessary changes, preferably makes a service call to start the service controlling the requested resource, and stores the necessary data to be used at the response stage. From the received function call, the first conversion block 19 examines the parameters to determine which resource is needed. Furthermore, if necessary, the first conversion block 19, reads the information stored in the transmission buffer and transfers it to the resource to be called. After the resource in question has been determined in the first conversion block 19, a message complying with the message structure of the first operating system OS_A is preferably formed and transmitted to the first interface 17 by means of the message transmission mechanisms of the first operating system. If necessary, the first interface 17 informs the scheduler SCH_A of the first operating system that the first interface 17 is waiting for execution time (arrow 102).

The first interface 17 is a process of its own, which is capable of communicating with the other processes of the first operating system OS_A. At the stage when the first interface 17 is in turn for execution, it is examined, if there are new or unprocessed messages intended for the first interface 17. If there are such messages, they are examined. On the basis of the parameters to be transmitted in the message, the first interface 17 determines the resource which is to be executed. Thus, the first interface 17 transmits possible parameters received with the message to the service controlling this resource.

The service can be, for example, a service that can be started by means of a program interrupt. Thus, when a program interrupt 103 comes in, a program interrupt handler IH_A starts the service 104 corresponding to the interrupt in question. In the example situation of FIG. 1*c*, the program interrupt interrupts the execution of the thread THA2 for the time of the interrupt handling. After the service has executed the requested function, it transmits a response to the first interface 17 (arrow 106). The execution of the service is preferably ended 105.

At the stage when the first interface 17 is in turn 107 for execution again, it is examined if the service controlling the called resource has formed a response. After the response has been formed, it is preferably transmitted by means of the message transmission mechanisms of the first operating system OS_A to the second conversion block 20. The data stored in connection with the transmission of the resource request are used to find out, for example, the delayed function call to be used for giving the response, as well as the address of a possible message buffer. The data received with the response are stored in the message buffer, and the delayed function call is added in the process table of the second operating system OS_B (arrow 108). Thus, this delayed function call is always executed at the stage when the scheduler SCH_B of the second operating system allocates it processing time (arrow 109), wherein the delayed function call transmits a response to the called process (arrow 111), which in this example is the thread THB2 of the second operating system. After this, the processing of the delayed function call DFC can be terminated (arrow 110).

The calling process can be set, for example, in a wait state at the stage when the function call has been made, or the process can be continued, wherein the process is informed of the reception of a response. For example, if the process is a display control process, it is not interrupted, but the updating of information to be displayed on the display 7 is continued in the normal way. After the reception of the response, said response is displayed on the display 7.

In said real time clock example, the service transmitting the request, such as the device driver of the real time clock, allocates a message buffer in the memory 4 for the response and forms a delayed function call. Information about the required resource, the message buffer and the delayed function call is transmitted to the interface block. The first interface 17 communicates with the service which processes the synchronization information of the real time clock, for example stores the time difference between the time data received via a mobile communication network and the real time clock of the electronic device. This time difference data is transferred to the second conversion block 20, in which the data is stored in the message buffer and the delayed function call is included in the process table. In the delayed function call, the data stored in the message buffer is read and transferred to the device driver of the real time clock. The device driver of the real time clock can now compare the time difference data received earlier with the time difference data received now, wherein on the basis of the change in the time difference data, the device driver of the real time clock can fine-adjust the operation of the real time clock 12.

In an electronic device 1 according to a preferred embodiment of the invention, comprising mobile station functions 2a and data processing functions 2b, there are several such resources which are controlled by one operating system and which are still needed by both operating systems OS_A, OS_B. Some non-restrictive examples of resources controlled by the first operating system OS_A, to be mentioned here, include the management of the permanent memory 5a, start-up/turn-out indications, and operations of the digital signal processing unit DSP (such as the above-mentioned storage of synchronization data of the real time clock 12). Some non-restrictive examples of the resources controlled by the second operating system OS_B, to be mentioned herein, include the operations related to the user interface 6, time services, such as the control of the real-time clock 12, the processing of some registers 4d, and the mode change of the flash memory 4e.

The above-presented principles can also be applied for using the resources controlled by the second operating system OS_B from the first operating system OS_A. For example, in a situation in which there is a call coming in via the mobile communication means, this can be indicated by a notice displayed on the display 7 of the electronic device. In an electronic device 1 according to an advantageous embodiment of the invention, this can be implemented for example in the following way. After the mobile communication means 11 have received information about an incoming call from the mobile communication network, a message according to the message structure of the first operating system OS_A is formed in a thread of the process controlling the operation of the mobile communication means. This message is transferred to the first interface 17. At the stage when the scheduler of the first operating system OS_A allocates execution time for the thread of the first interface, the received message is examined and the data of the message are transferred to the second conversion block 20. In this second conversion block 20, the delayed function call. DFC is formed for transmitting the information contained in the message to the device driver controlling the display 7. After the second conversion block 20 has formed the information needed in the delayed function call, the second conversion block 20 will add the delayed function call in the process table of the second operating system. After this, the delayed function call is processed according to the scheduling of the second operating system, controlled by the scheduler SCH_B of the second operating system OS_B. The process which transmitted the message in the first operating system does not need to remain waiting for the processing of the further processing steps of the message, but the process can continue its own operation.

The different steps of the message according to the invention can be largely implemented in the application software of one or more processors 3a, 3b.

The method of the invention can also be applied in such systems, in which it is possible to connect auxiliary cards or the like to the electronic device 1, to increase the functions of the electronic device 1. For example, auxiliary cards can be connected to a portable computer. Thus, by connecting a radio card to the portable computer, the portable computer can use the wireless communication properties of the radio card for transmitting information between the portable computer and a wireless communication network. In this example application, the first operating system OS_A is preferably an operating system to be executed on an auxiliary card and the second operating system OS_B is an operating system to be executed in the portable computer.

It is obvious that the invention is not limited solely to the above-presented embodiments, but it can be modified within the scope of the appended claims. The invention can also be applied in connection with one processor, wherein the processor is arranged to execute the functions of at least two operating systems.

The invention claimed is:

1. A method, for use in a device having a first and a second operating systems each controlling a set of resources, at least one of said operating systems being a real-time operating system, said method comprising:
    forming a function call in the second operating system, said function call comprising information about a resource of the set of resources controlled by the first operating system,
    transferring said function call to an interface block formed between the operating systems,
    examining the information included in said function call in said interface block to determine the resource that the function call is related to,
    forming a service call requesting the resource on the basis of the examination in said interface block, and
    transferring said service call to the first operating system for starting a resource service in the first operating system, wherein the resource service forms a response, and the method further comprises transferring the response via said interface block to the second operating system, wherein in said interface block, a delayed function call is determined to be executed in the second operating system, and wherein transforming the response to the second operating system comprises transferring the response to the second operating system in the delayed functional call.

2. The method according to claim 1 wherein the first operating system comprises a first scheduler for scheduling the execution of processes of the first operating system, and the second operating system comprises a second scheduler for scheduling the execution of processes of the second operating system, and the method further comprises:
    executing said service call to start the resource service as scheduled by the first scheduler.

3. The method according to claim 1, wherein substantially immediately after the function call formed in the second operating system has been transmitted to the interface block, the execution of the processes of the second operating system is continued, without waiting for a response to the function call from the first operating system.

4. The method according to claim 1, wherein in the operating systems, processes are executed, for which a run stage, ready stage or wait stage is determined as the functional state of the processes, said function call is formed in a process of the second operating system whose functional state is in the run stage, and that the process which made said function call is set in the wait stage, if a response to the function call is waited from the first operating system.

5. The method according to claim 1, wherein as said function call, the same function call is used, irrespective of the resource service to be started.

6. An apparatus, comprising at least one processor, said at least one processor comprises:
    a first processing unit configured to process a first operating system,
    a second processing unit configured to process a second operating system, and an interface block formed between the first and the second processing units, wherein at least one of the first and second operating systems is a real-time operating system, and wherein the first operating system and the second operating system each controls a set of resources, and wherein the processor is configured to:

form a function call in the second operating system, said function call comprising information about a resource of the set of resource controlled by the first operating system, transfer said function call to said interface block, examine the information included in said function call in said interface block to determine the resource that the function call is related to, form a service call requesting the resource on the basis of said examination in said interface block, and transfer said service call to the first processing system for starting a resource service in the first operating system, wherein the resource forms a response, and the response is transferred via said interface block to the second operating system, wherein in said interface block, a delayed function call is determined to be executed in the second operating system, and wherein the response transferred to the second operating system is for transfer to the second operating system in the delayed function call.

7. The apparatus according to claim 6, further comprising:
a first scheduler configured to schedule execution of processes in the first operating system, and
a second scheduler configured to schedule execution of processes in the second operating system,
wherein said resource service is started when it is scheduled by the first scheduler in the first operating system.

8. The apparatus according to claim 6, wherein the processor is further configured to:
form a response in the started resource service in the first operating system, and
transfer the response via said interface block to the second operating system.

9. An electronic device comprising at least one processor and apparatuses for providing resources, said at least one processor comprises:
a first processing unit configured to process a first operating system,
a second processing unit configured to process a second operating system, and
an interface block formed between the first and the second processing units,
wherein said device is operable using a said first operating system and a said second operating system in said at least one processor, said first and second operating systems each controlling a set of resources, and at least one of the operating systems being a real-time operating system, and wherein the at least one processor is configured to:
form a function call in the second operating system, said function call comprising information about a resource of the set of resources controlled by the first operating system, transfer said function call to the interface block,
examine the information included in said function call in said interface block to determine the resource that the function call is related to, form a service call requesting the resource on the basis of said examination in said interface block, and transfer said service call to the first operating system for starting a resource service in the first operating system, wherein the resource service forms a response, and the response is transferred via said interface block to the second operating system, wherein in said interface block, a delayed function call is determined to be executed in the second operating system, and wherein the response transferred to the second operating system is for transfer to the second operating system in the delayed function call.

10. A mobile station, comprising:
at least one processor and apparatuses for providing resources, said at least one processor comprising a first operating system, a second operating system and an interface block formed between the operating systems, said first and second operating systems each controlling a set of resources, and at least one of the operating systems being a real-time operating system, wherein the at least one processor is configured to:
form a function call in the second operating system, said function call comprising information about a resource of the set of resources controlled by the first operating system, transfer said function call to the interface block formed between the operating systems, examine the information included in said function call in said interface block to determine the resource that the function call is related to, form a service call requesting the resource on the basis of said examination in said interface block, and transfer said service call to the first operating system for starting a resource service in the first operating system, wherein the resource service forms a response for transfer via said interface block to the second operating system, wherein in said interface block, a delayed function call is determined to be executed in the second operating system, and wherein transfer of the response to the second operating system comprises a transfer of the response to the second operating system in the delayed function call.

11. A computer software product comprising a computer readable medium having computer program code stored thereon for use in an electronic device, said electronic device comprises at least one processor and apparatuses for providing resources, said electronic device being operable using a first operating system and a second operating system in said at least one processor, said first and second operating systems each controlling a set of resources, and at least one of the operating systems being a real-time operating system, wherein the electronic device comprises an interface block formed between the operating systems, and the program code comprises:

instructions for forming a function call in the second operating system, said function call comprising information about a resource of the set of resources controlled by the first operating system, instructions for transferring said function call to the interface block formed between the operating systems, instructions for examining the information included in said function call in said interface block to determine the resource that the function call is related to, instructions for forming a service call requesting the resource on the basis of said examination in the interface, and instructions for transferring said service call to the first operating system for starting a resource service in the first operating system, wherein the resource service forms a response, and the method further comprises transferring the response via said interface block to the second operating system, wherein in said interface block, a delayed function call is determined to be executed in the operating system, and wherein transferring the response to the second operating system comprises transferring the response to the second operating system in the delayed function call.

* * * * *

UNITED STATES PATENT AND TRADEMARK OFFICE
CERTIFICATE OF CORRECTION

PATENT NO. : 7,581,223 B2  Page 1 of 1
APPLICATION NO. : 10/327243
DATED : August 25, 2009
INVENTOR(S) : Teemu Harjula It is certified that error appears in the above-identified patent and that said Letters Patent is hereby corrected as shown below:

In column 14, line 36, claim 1, line 26 "functional" should be --function--.
In column 14, line 37, claim 2, line 1 after "claim 1" --,-- should be inserted.
In column 15, line 20, claim 6, line 26 after "resource" --service-- should be inserted.

Signed and Sealed this

Twenty-seventh Day of October, 2009

David J. Kappos
*Director of the United States Patent and Trademark Office*